Aug. 30, 1960    J. J. COONEY    2,950,944

WHEEL BEARING RETAINING MEANS

Filed March 25, 1957

INVENTOR.
JAMES J. COONEY
BY
Paul A. Weilein
ATTORNEY

United States Patent Office 2,950,944
Patented Aug. 30, 1960

2,950,944

WHEEL BEARING RETAINING MEANS

James J. Cooney, 1041¾ N. Gardner,
Hollywood 46, Calif.

Filed Mar. 25, 1957, Ser. No. 648,198

5 Claims. (Cl. 308—236)

The present invention relates to wheel bearing means, and more particularly to improved means for enabling precision adjustment of a conventional nut on a stub axle or spindle of a wheeled vehicle such as the front wheel spindles of motor vehicles or the stub axles of trailers and the like.

In securing the front wheel bearing and the front wheel of a motor vehicle to the spindle, it has been the common practice to place a washer on the spindle against the bearing race, the washer having an inner peripheral key and the spindle having an axially extended key-way for receiving the key. A conventional castellated nut is then threaded on the spindle and tightened until the bearing is loaded to the extent that a drag is imposed upon the wheel. Thereupon the nut is backed off until the wheel will rotate freely without wobble or play.

However, the nut must then be locked in place. Conventionally, the spindle is provided with a transverse hole therethrough for receiving a cotter key. The cotter key must project through an opposite pair of slots in the nut, but in order to accomplish this it may be necessary to turn the nut before the pair of slots line up with the opening in the spindle, thus either tightening the nut on the bearing or loosening the nut more than is desired for a proper setting. Practice indicates that if the nut is tightened as aforesaid the bearing may be loaded so that overheating and short bearing life result. If the nut is tacked off excessive bearing freedom results, with attendant wheel wobble.

Such wobble of the front wheels of a motor vehicle results in uneven tire wear and loss of vehicle control and braking efficiency. All of these undesirable results would be precluded if the nut could be precisely positioned and locked in such position with bearing clearance on the order of .001".

Accordingly, a primary object of this invention is to provide means for effectively locking the bearing nut in any desired appropriate position on the spindle, without necessitating rotation of the nut to align key receiving openings in the spindle and the nut.

A further object is to provide a novel nut locking device which is adapted to be interposed between the nut and the conventional keyed washer, the locking device and the washer having cooperative means for precluding relative rotation thereof, and the locking device also having a locking portion adapted to project axially into overlying relation to the nut, whereby bending of said locking portion into engagement with the nut provides a positive lock for preventing rotation of the nut.

These objectives are preferably attained by the provision of an annular nut locking device having a radially extended wall, this wall having a spindle accommodating opening, and an axially converging outer peripheral flange on the wall adapted to encircle the nut. This converging flange formation facilitates crimping or bending of the flange into engagement with the straight sides of the nut by striking a blow on the socket head of a wrench.

Specifically, the invention contemplates modifying the keyed washer aforesaid by the provision of one or more openings therein. Otherwise, all of the standard elements are employed in securing a wheel bearing on a spindle, except for the fact that no cotter key is required. This is a further advantage to be derived from the invention, since the drilling of a transverse key hole through a spindle or axle is a relatively time consuming and expensive shop operation which is no longer necessary by virtue of the improved locking means hereof. Moreover, the elimination of the need for a cotter key also eliminates the need for a castellated nut, thus affording further economic advantage since a conventional hexagonal nut (not shown) may be employed in lieu of the castellated nut 11 herein shown.

In order to key or interlock the locking element hereof to the keyed washer aforesaid, the radial wall of the locking element is provided with one or more projections engageable in the previously mentioned opening or openings in the keyed washer. Preferably such projection or projections are formed in the locking element by striking buttons or projections in the radial wall during manufacture of the locking element.

Other objects and advantages of the invention will be hereinafter described or will become apparent as the description progresses, and the novel features thereof will be defined in the appended claims.

In the accompanying drawing.

Like reference characters in the several views of the drawing and in the following detailed description designate corresponding parts.

Figure 1:
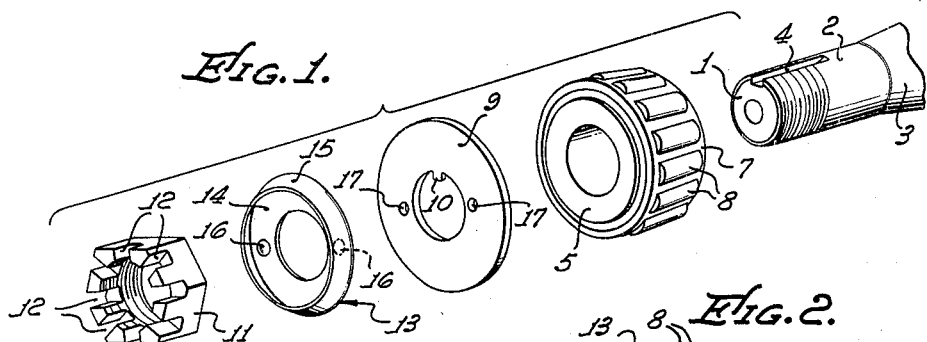
Fig. 1 is an exploded detail view in perspective, showing the normal components of a wheel bearing and bearing-retaining assembly, together with the novel locking element of the invention, the keyed washer being modified for cooperation with the locking element.

A conventional type of stub axle or spindle is herein illustrated, this spindle having a threaded free end 1 and an unthreaded cylindrical section or bearing receiving portion 2 merging with a tapered body 3. Extending axially of the spindle through the threaded end 1 and into the cylindrical section 2 is a keyway 4. Heretofore, the spindle end 1 would have also been provided with a cotter key receiving opening (not shown) extended transversely therethrough, but by virtue of this invention the need for such an opening is obviated, and significant savings in time and expense in fabricating the spindle are accordingly effected.

A conventional wheel bearing is also shown as including an inner bearing cup or race 5 having an inclined or tapered roller seat 6 on its outer periphery. Rotatably mounted in the roller seat 6 is a roller assembly including a cage or carrier 7 having a plurality of rollers 8 therein.

A further conventional element, except for a slight modification which will be later described, is a torque absorbing washer element 9 having a central opening for enabling positioning of the washer on the spindle. The washer 9 has a key 10 projecting radially inwardly from its inner periphery for cooperative engagement in the keyway 4 of the spindle.

In conjunction with the elements thus far described, a castellated hexagonal nut as indicated at 11 is ordinarily employed to force the washer and the bearing axially on the spindle until the tapered bearing is loaded in a tapered bearing seat of a wheel (not shown) adapted to be journaled on the bearing. Then it has been the practice to back the nut off and insert a cotter key through a pair of opposed slots 12 of the nut and through the cotter key opening in the spindle as previously referred to, so as to lock the nut against movement responsive to vibration. Aligning a pair of the slots 12 with such cotter key opening has heretofore presented the problem that an ideal positioning of the nut was precluded. Obviously, it would be desirable to back the nut off only enough to relieve the bearing of undue axial loading so as to prevent excessive friction and heat and to prolong bearing life. Otherwise stated, it is desirable to apply only a limited tightening torque to the nut. Rather than have a tight bearing, the prior practice in aligning the nut slots 12 with the aforementioned cotter key opening has been to overly loosen the nut, thus resulting in an unstable or wobbly wheel mounting, with attendant excessive tire wear, faulty braking and lack of vehicle control.

In accordance with the salient features of the invention, a nut locking element 13 is provided. This element 13 is shown as being annular in form, having a straight radially extended body wall 14. The wall 14 has a central opening therethrough to enable its being disposed about the spindle. At its outer periphery, the element 13 is provided with an axially extended flange 15 which is shown as continuous, but which may be non-continuous without departing from the invention. In its radial dimension, the locking element is of such proportion as to project beyond the peaks or apices at the juncture of the straight sides of the hexagonal nut.

A prime factor in the case of utilization of the locking member 13 is that the flange 15 is tapered or arched so as to converge towards the axis of the element. However the diametrical distance across the opening defined by the free edge of the flange 15 is preferably greater than or equal to the maximum diametrical distance across opposed peaks or apices of the nut 11.

In order to provide means for keying or locking the locking element 13 against rotation, this element and the washer 9 are preferably provided with cooperatively interengageable means. To this end, during fabrication of the locking element 13, it is preferably formed, as by stamping, with one or more protuberances or detent-like buttons 16. In the specific illustrative embodiment two such buttons 16 are shown in diametrically spaced positions.

Figure 4:
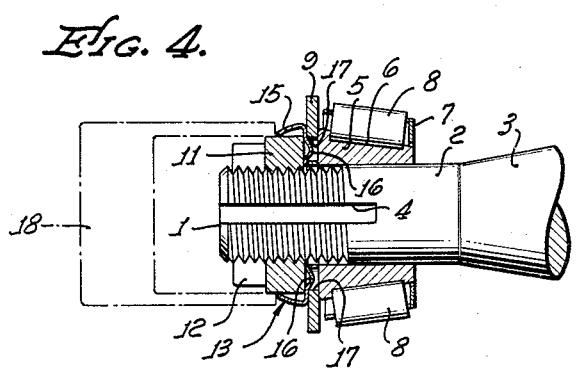
Fig. 4 is a view in section, as taken on the line 4—4 of Fig. 2, and showing in broken lines a socket wrench in place on the nut for tightening the assembly.
Figure 5:
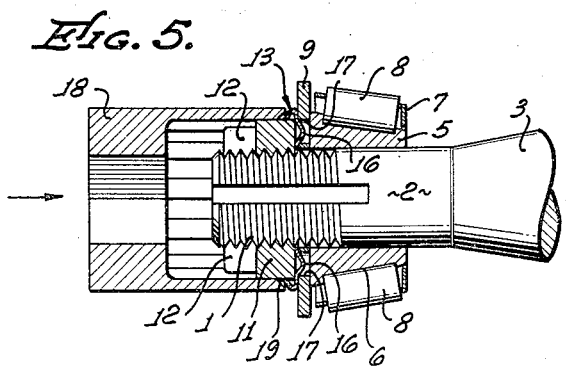
Fig. 5 is a view in section similar to Fig. 4, and showing a socket wrench as employed for deforming or crimping the nut locking element into engagement with the flat sides of the nut.

As previously noted, the otherwise conventional washer 9 is modified by the formation of one or more recesses or openings 17, as by a simple stamping operation. These recesses are adapted to receive the protuberances or buttons 16 of the locking element 13 when the parts are in assembled relations, as shown in Figs. 4 and 5. The specific means for interlocking the locking element 13 and the washer element 9 may be varied, but advantages in simplicity of manufacture accrue by virtue of the means illustrated herein.

Figure 2:
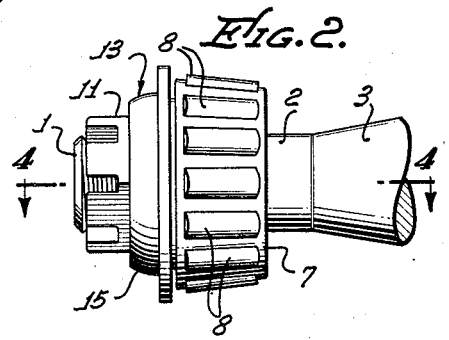
Fig. 2 is an assembly view in side elevation, showing a wheel bearing retained on a spindle in accordance with the invention prior to deformation of the nut locking element hereof.
Figure 3:
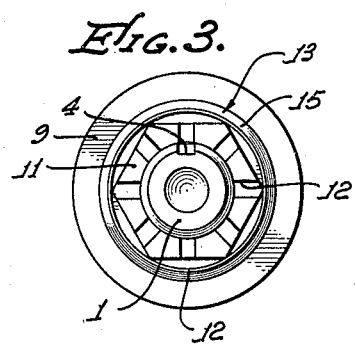
Fig. 3 is a view in end elevation of the assembly of Fig. 2.
Figure 6:
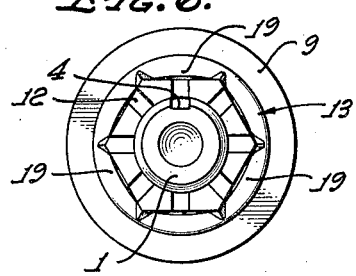
Fig. 6 is a view in end elevation, showing the deformed or crimped nut locking element in locking engagement with the nut.

In assembling a bearing on a spindle, a socket wrench, the head 18 of which is shown in broken lines in Fig. 4 and in full lines in Fig. 5, is employed to tighten the assembly. A torque wrench may advantageously be utilized in the socket head so as to tighten the nut to an optimum degree for bearing life and efficiency. When the nut is so tightened, the flange 15 of the locking element 13 will be in the condition indicated in Figs. 2, 3, and 4. Thereupon, however, the socket head 18 may be struck with a hammer or other tool, and the flange 15 will be deformed or crimped as shown in Figs. 5 and 6. The deformation of the flange 15 provides the flange with a plurality of straight-edged bearing portions 19 which engage the flat sides of the nut 11. This prevents rotation of the nut due to vibration, since the locking element 13 is keyed to the washer 9, which in turn is keyed to the spindle.

The deformation or crimping of the flange 15 in the manner above noted, is made possible by the fact that the washer 9 provides a surface backing up the outer marginal portion of the wall 14 of the locking element 13. In other words, the juncture portion of the flange 15 and wall 14 is engaged with a surface of the washer 9 so that when the axially directed force is applied to the flange by striking the head 18 of the socket wrench, the washer will prevent axial distortion of the juncture portion past the plane of the washer whereby the distorting force is effective to crimp the flange against the nut 11. A tight crimping of the flange 15 against the nut is assured by reason of the angular disposition of the flange, as is apparent upon reference to Fig. 4.

It will now be obvious, that the invention provides an improved means for locking a nut on a threaded stem and particularly for locking a wheel bearing retaining nut in a precise position on an axle, thereby assuring longer trouble free life of the bearing, without wheel wobble or undue friction.

While the specific details of an illustrative embodiment have been herein shown and described, changes and alterations may be resorted to without departing from the spirit of the invention as defined in the appended claims.

I claim:

1. A bearing retaining assembly for locking a bearing on an axle having a threaded end and a keyway comprising: a washer having a key engageable in said keyway; an annular locking element disposed adjacent said washer; said locking element and said washer having cooperatively interengaged means for preventing rotation of said locking element relative to the washer; a nut threadedly engageable with said shaft to press said washer and locking element together against the bearing; said locking element having a marginal portion projecting into overlying relation to said nut and deformable into engagement with the nut for preventing rotation of the nut; and said washer having a surface disposed to prevent the juncture portion of said projecting marginal portion and said locking element from being axially distorted past the plane of said washer incident to said projecting marginal portion being struck a blow directed axially thereof toward said washer.

2. A bearing retaining assembly for locking a bearing on an axle having a threaded end and a keyway comprising: a washer having a key engageable in said keyway; an annular locking element disposed adjacent said washer; said locking element and said washer having cooperatively interengaged recesses and protuberances for preventing rotation of said locking element relative to the washer; a nut threadedly engageable with said shaft to press said washer and locking element together against the bearing; said locking element having a marginal flange projecting in entirety axially from one side of said locking element into overlying relation to said nut and being deformable into engagement with the nut for preventing rotation of the nut; and said washer having a surface thereof disposed to prevent the juncture portion of said flange and said locking element from being axially distorted past the plane of said washer incident to said flange being struck a blow directed axially thereof toward said washer.

3. A bearing retaining assembly for locking a bearing on an axle having a threaded end and a keyway comprising: a washer having a key engageable in said keyway; an annular locking element disposed adjacent said washer; said locking element and said washer having cooperatively interengaged means for preventing rotation of said locking element relative to the washer; a nut threadedly engageable with said shaft to press said washer and locking element together against the bearing; said locking element having a marginal portion projecting into overlying relation to said nut and deformable into engagement with the nut for preventing rotation of the nut; said marginal portion being inclined towards said nut; and said washer having a surface thereof disposed to prevent the juncture portion of said flange and said locking element from being axially distorted past the plane of said washer incident to said flange being struck a blow directed axially thereof toward said washer.

4. Locking means for a nut mounted on a threaded stem comprising: a washer constructed to be non-rotatably mounted on said stem; an annular locking member adapted to be mounted on said stem between said washer and said nut; means on said annular member and said washer, respectively, detachably engageable for restraining relative angular movement of said washer and said annular member about said stem; and a bendable flange joined to said annular member and extending in entirety from the outer face thereof alongside and toward said nut; the diameter of said annular member being greater than that of said nut; and the diameter of said washer being greater than that of said annular member; the juncture portion of said flange and said annular member bearing against said outer face of said washer whereby a blow directed against the free end of said flange will cause said flange to bend into locking engagement with said nut.

5. Locking means for a nut mounted on a threaded stem comprising: a washer adapted to be mounted on said stem; a locking member adapted to be mounted on said stem between said washer and said nut; means on said locking member and said washer cooperable for restraining relative angular movement of said washer and said locking member about said stem; and a bendable flange joined to said locking member and extending toward said nut; the diameter of said locking member being greater than that of said nut; and the diameter of said washer being greater than that of said locking member; the juncture portion of said flange and said locking member bearing against said outer face of said washer whereby a blow directed against the free end of said flange will cause said flange to bend into locking engagement with said nut.

References Cited in the file of this patent

UNITED STATES PATENTS

| | | |
|---|---|---|
| 598,302 | Craddock | Feb. 1, 1898 |
| 995,760 | Anderson | June 20, 1911 |
| 2,147,787 | Ferguson | Feb. 21, 1939 |
| 2,225,654 | Olson | Dec. 24, 1940 |
| 2,332,684 | Armitage | Oct. 26, 1943 |

FOREIGN PATENTS

| | | |
|---|---|---|
| 26,711 | Switzerland | Aug. 22, 1902 |
| 106,202 | Great Britain | Aug. 9, 1916 |
| 398,745 | Germany | July 18, 1924 |
| 345,824 | Great Britain | Apr. 2, 1931 |